United States Patent
Minami et al.

(10) Patent No.: US 9,318,237 B2
(45) Date of Patent: Apr. 19, 2016

(54) CABLE HARNESS AND WATER CUTOFF STRUCTURE

(71) Applicants: Toyota Jidosha Kabushiki Kaisha, Toyota-shi Aichi-ken (JP); Sumitomo Wiring Systems, Ltd., Yokkaichi, Mie (JP)

(72) Inventors: Shoichi Minami, Nisshin (JP); Yoshimi Uchida, Yokkaichi (JP); Masanori Hirotsuji, Yokkaichi (JP)

(73) Assignees: Toyota Jidosha Kabushiki Kaisha, Toyota-shi (JP); Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 14/478,084

(22) Filed: Sep. 5, 2014

(65) Prior Publication Data

US 2015/0060134 A1 Mar. 5, 2015

(30) Foreign Application Priority Data

Sep. 5, 2013 (JP) ................. 2013-184419

(51) Int. Cl.
 *H01B 7/00* (2006.01)
 *H01B 7/282* (2006.01)
 *B60R 16/02* (2006.01)

(52) U.S. Cl.
 CPC .......... *H01B 7/0045* (2013.01); *B60R 16/0222* (2013.01); *H01B 7/282* (2013.01)

(58) Field of Classification Search
 CPC ....... H01B 17/58; H01B 7/0045; H01B 7/282
 USPC ................................. 174/153, 72 A
 See application file for complete search history.

(56) References Cited

U.S. PATENT DOCUMENTS

| 4,460,805 A * | 7/1984 | Johnson ..................... 174/152 G |
| 8,842,954 B2 * | 9/2014 | Burris et al. .................. 385/101 |
| 2007/0116518 A1 * | 5/2007 | Tortorici ................. E02D 29/14 404/25 |
| 2008/0017401 A1 * | 1/2008 | Uchida ............... B60R 16/0222 174/153 G |
| 2014/0151087 A1 | 6/2014 | Adachi et al. |

FOREIGN PATENT DOCUMENTS

| JP | 2012-085387 A | 4/2012 |
| JP | 2012-165485 A | 8/2012 |
| JP | 2012-231572 A | 11/2012 |
| JP | 2013-038919 A | 2/2013 |

* cited by examiner

*Primary Examiner* — Hoa C Nguyen
*Assistant Examiner* — Stanley Tso
(74) *Attorney, Agent, or Firm* — Dinsmore & Shohl LLP

(57) ABSTRACT

A cable harness includes a plurality of cables and an electrically-conductive outer conductor surrounding the plurality of cables. The outer conductor is partially constituted by a conductor tube having a smooth outer peripheral surface. An outside water cutoff member configured to prevent water from coming inside a hole of a body panel is placed between the smooth outer peripheral surface of the conductor tube and an edge of the hole of the body panel. Further, an inside water cutoff member having through holes through which the plurality of cables of the conductor tube passes, and configured to close an end of the conductor tube is provided.

10 Claims, 2 Drawing Sheets

CABLE HARNESS AND WATER CUTOFF STRUCTURE

INCORPORATION BY REFERENCE

The disclosure of Japanese Patent Application No. 2013-184419 filed on Sep. 5, 2013 including the specification, drawings and abstract is incorporated herein by reference in its entirety.

BACKGROUND OF THE INVENTION

1. Field of the Invention

The present invention relates to a cable harness used in a vehicle and a water cutoff structure thereof.

2. Description of Related Art

There has been known a harness that bundles an electric wire for electrically connecting a sensor or an actuator provided in a vehicle to a control device, and an electric wire for supplying an electric power. A harness that communicates an inside of a passenger compartment of a vehicle with an outside thereof is passed through a hole of a body panel constituting a vehicle body and separating the inside of the passenger compartment from the outside thereof. A gap between the hole and the harness is closed by a grommet made of a flexible material such as rubber, so that water invasion from the gap into the passenger compartment is prevented.

The grommet has a hole through which the harness passes. In a case where a plurality of electric wires is bundled up, an outer circumference of the bundle becomes uneven due to respective outer shapes of the electric wires. In view of this, even if the grommet is flexible, an inner peripheral surface of the hole of the grommet may not sufficiently make close contact with the bundle of the electric wires. Japanese Patent Application Publication No. 2012-85387 (JP 2012-85387 A) describes a technique in which a water cutoff portion in which electric wires are buried is provided in a harness, and an inner peripheral surface of a hole of a grommet makes close contact with an outer peripheral surface of the water cutoff portion so as to prevent water from coming inside. The water cutoff portion is made of resin, so that gaps between the electric wires and gaps between the grommet and the electric wires are filled up with resin. The outer peripheral surface of the water cutoff portion does not have unevenness due to the electric wires, so that water cutoff performance with respect to the grommet is secured. Japanese Patent Application Publication No. 2012-231572 (JP 2012-231572 A) describes a technique in which a molten water-stopping agent is penetrated into gaps between electric wires, and then hardened so as to fill the gaps between the electric wires. Japanese Patent Application Publication No. 2012-165485 (JP 2012-165485 A) describes a technique in which a foaming liquid concentrate is injected between electric wires placed in a tubular portion of a grommet so as to foam in place, thereby filling gaps between the electric wires and gaps between the electric wires and the tubular potion with a water cutoff body.

In a case where a high-frequency current flows in electric wires, an electromagnetic shield may be performed by surrounding the electric wires with a braided wire so as to prevent an electromagnetic wave from being radiated from the electric wires. The braided wire is formed by weaving thin element wires, and there are small gaps between the element wires. It is difficult to penetrate resin into all of the gaps, and water may invade into a passenger compartment from some gaps that are not filled with the resin.

SUMMARY OF THE INVENTION

In an embodiment of the present invention, a harness includes electric wires that requires an electromagnetic shield, and water is surely cut off in that part of the harness which penetrates through a body panel.

A cable harness according to an embodiment of the present invention includes: a plurality of cables; and an electrically-conductive outer conductor surrounding the plurality of cables. The cable harness penetrates through a hole of a body panel. The outer conductor is partially constituted by a conductor tube having a smooth outer peripheral surface, and an outside water cutoff member is placed between the smooth outer peripheral surface of the conductor tube and an edge of the hole of the body panel, so as to prevent water from passing outside of the conductor tube through the hole of the body panel. Further, an inside water cutoff member is provided so as to prevent water from passing through the inside of the conductor tube. The smooth outer peripheral surface of the conductor tube makes close contact with the outside water cutoff member, thereby making it possible to prevent invasion of water.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
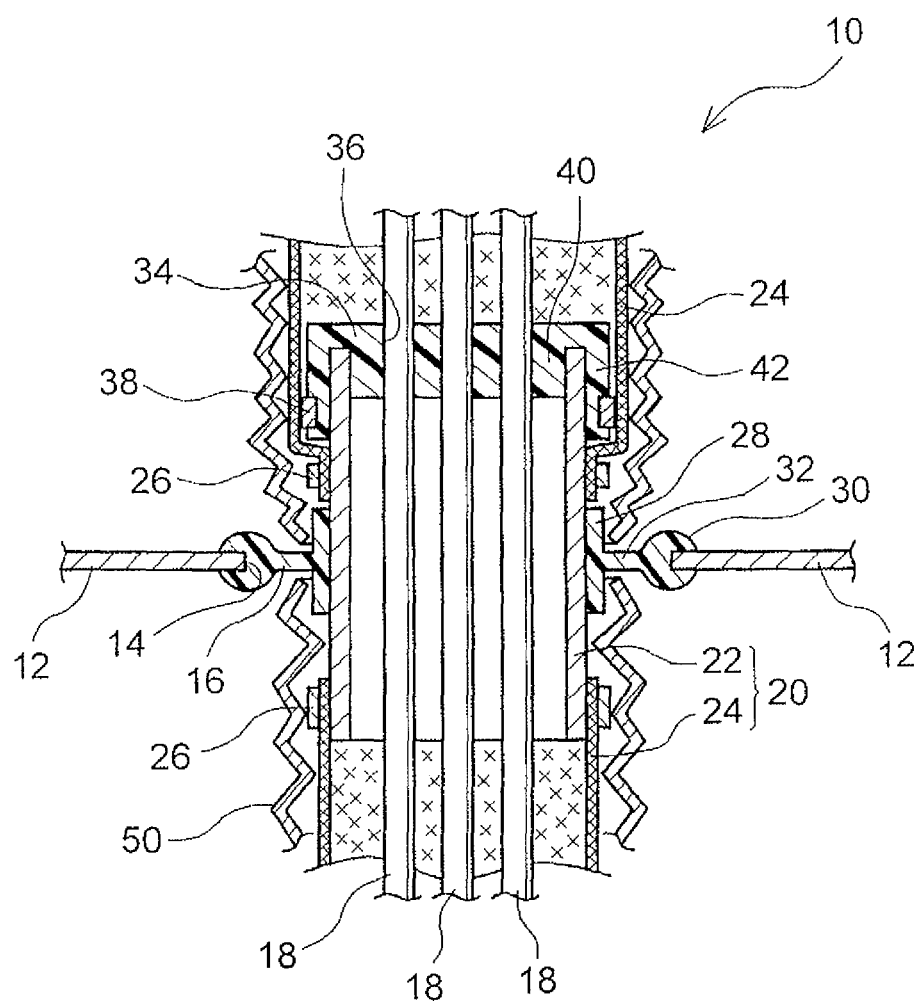
FIG. 1 is a sectional view illustrating a configuration of a cable harness according to an embodiment of the present invention and its vicinal area.

An embodiment of the present invention is described below with reference to the drawings. FIG. 1 is a sectional view schematically illustrating a configuration of that part of a cable harness 10 which passes through a body panel 12, and its vicinal area. The body panel 12 is a member made from a metal plate such as a steel plate and constituting a vehicle body, and particularly, a member forming a passenger compartment. In FIG. 1, an upper side relative to the body panel 12 is an inside of the passenger compartment, and a lower side relative to the body panel 12 is an outside of the passenger compartment. The passenger compartment includes a space where an occupant gets in and a space for loading luggage therein, and further, the passenger compartment is a space for which invasion of water or the like from its outside should be prevented. In the meantime, a hole for passing a harness therethrough may be provided in the body panel so as to electrically connect devices provided inside and outside the passenger compartment. For example, in a case where a power control device for supplying an electric power to a vehicle-drive electric motor is placed inside the passenger compartment, it is necessary to provide, in the body panel 12, a hole 14 through which a power cable harness for connecting the power control device to the electric motor. The body panel 12 is a floor panel, for example. It is necessary to prevent invasion of water into the passenger compartment through the hole 14, that is, water cutoff is required. The following description deals with the power cable harness, as an example.

The cable harness 10, which is a power cable, is passed through the hole 14 provided in the body panel 12. In order to close the hole 14, a grommet 16 is placed. The grommet 16 closes a gap between an outer circumference of the cable harness 10 and an edge of the hole 14, so as to prevent invasion of water from the gap into the vehicle compartment. At least part of the grommet 16 is made from a flexible material such as rubber. Due to flexibility thereof, closeness of the hole 14 of the body panel with respect to the cable harness 10 increases, which can ensure water cutoff. Further, the cable harness 10 has a water cutoff structure to prevent invasion of water through an inside thereof. This will be described later more specifically.

The cable harness 10 includes three cables 18, and an outer conductor 20 provided to surround the cables 18. The three cables 18 are power cables for supplying three-phase alternating-current power to an electric motor, for example. In a case where an electric power to be transmitted through the cables 18 is a direct current or a single-phase current, the number of cables 18 can be two. Further, in order to transmit electric power to a plurality of devices, more cables 18 may be provided. In a case where a frequency of electric power flowing through the cable 18 and a harmonic frequency of the electric power are high, an electromagnetic wave is radiated circumferentially, which may cause electromagnetic noise that affects operations of other devices. In view of this, the outer conductor 20 is provided. The outer conductor 20 has a function to shield the electromagnetic wave.

The outer conductor 20 is constituted by a conductor tube 22 and a braided wire 24. The conductor tube 22 is made of a conductive material, preferably metal, and more preferably aluminum, and has a generally cylindrical shape. In an internal space of the cylindrical shape, the three cables 18 are provided. An outer peripheral surface of the conductor tube 22 is a smooth surface without unevenness. Here, the "smooth surface" indicates a surface in a state where two surfaces adjacent to each other are flat to such an extent that water cutoff is achievable.

The braided wire 24 is formed in a tubular shape by weaving thin element wires made of a conductive material, preferably metal, and more preferably copper. The braided wire 24 surrounds the three power cables 18. Further, the braided wire 24 is connected to the conductor tube 22 in an electrically conductive manner at that position of the conductor tube 22 which is closer to an end side than a position thereof where the grommet 16 is attached. More specifically, an end of the braided wire 24 is fastened by a fastening band 26 so as to be fixed to the conductor tube 22. The braided wire 24 extends from a position at which the braided wire 24 is fixed to the conductor tube 22 toward a direction to be distanced from the conductor tube 22, along a direction where the cables 18 extend. In FIG. 1, the braided wire 24 fixed to an upper side relative to a position where the grommet 16 is attached extends upward, and the braided wire 24 fixed to a lower side relative to the position of the grommet 16 extends downward.

The braided wire 24 and the conductor tube 22 constitute a single conductor, and function as an electromagnetic shield member. Since the braided wire 24 is formed by weaving the thin element wires, the cable harness 10 is bendable. In the meantime, gaps are formed between the element wires, and therefore, water may leak through the gaps. Even if the gaps between the element wires are filled up with resin, the resin having high viscosity or high surface tension does not sufficiently penetrate into the gaps, thereby resulting in that water may not be sufficiently cut off. In view of this, in the cable harness 10, that part of the outer conductor 20 which cuts off water is constituted by the conductor tube 22 instead of the braided wire. The conductor tube 22 does not have any gaps, so that no water leak occurs. Further, as described above, the outer peripheral surface of the conductor tube 22 is smooth and makes close contact with the grommet 16 without any gaps, so that water leak is prevented.

The grommet 16 includes: a tubular conductor-tube-side connecting portion 28 connected to the conductor tube 22; an annular body-panel-side connecting portion 30 connected to the body panel 12; and a filmy portion 32 filling up a gap between the connecting portions 28, 30. The conductor-tube-side connecting portion 28 has a shape formed along the outer peripheral surface of the conductor tube 22. If a shape of that part of the conductor tube 22 which makes contact with the conductor-tube-side connecting portion 28 is a cylindrical shape, an inner peripheral surface of the conductor-tube-side connecting portion 28 is also formed in a cylindrical shape. The conductor-tube-side connecting portion 28 makes close contact with a whole circumference of the conductor tube 22, so as to prevent water between the grommet 16 and the conductor tube 22. The body-panel-side connecting portion 30 has a shape formed along the edge of the hole 14 of the body panel. If the hole 14 has a circular shape, the body-panel-side connecting portion 30 is formed in a toric shape. A groove is provided in an outer circumference of the body-panel-side connecting portion 28, so that the body panel 12 is provided inside the groove. The filmy portion 32 has a function to close the hole 14, more specifically, a gap between the edge of the hole 14 and the outer peripheral surface of the conductor tube 22.

As described above, the grommet 16 prevents water from passing the outside of the cable harness 10. That is, the grommet 16 functions as an outside water cutoff member. It is also necessary to prevent water from passing through the inside of the cable harness 10. Gaps are formed between the cables 18 and between the cables 18 and the conductor tube 22, and water may invade through the gaps. In view of this, the cable harness 10 is provided with a water cutoff cap 34 configured to prevent water by closing an end of the conductor tube 22. The water cutoff cap 34 functions as an inside water cutoff member configured to prevent water from passing through the inside of the conductor tube 22. The water cutoff cap 34 is made of an elastic material such as rubber. The water cutoff cap 34 is provided with three through holes 36 each configured to pass each of the three cables 18 therethrough. The cable 18 makes close and sealing contact with an inner peripheral surface of the through hole 36 so as to prevent water from passing there through. The water cutoff cap 34 is fastened by a fastening band 38 so as to be fixed to the outer peripheral surface of the conductor tube 22.

Figure 2:
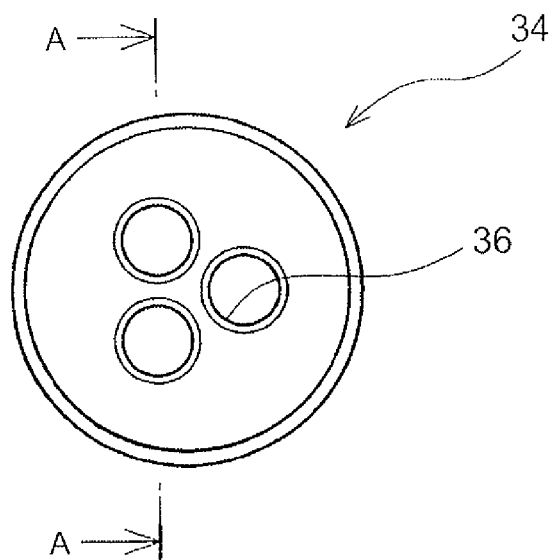
FIG. 2 is a view illustrating a configuration of a water cutoff cap.
Figure 3:
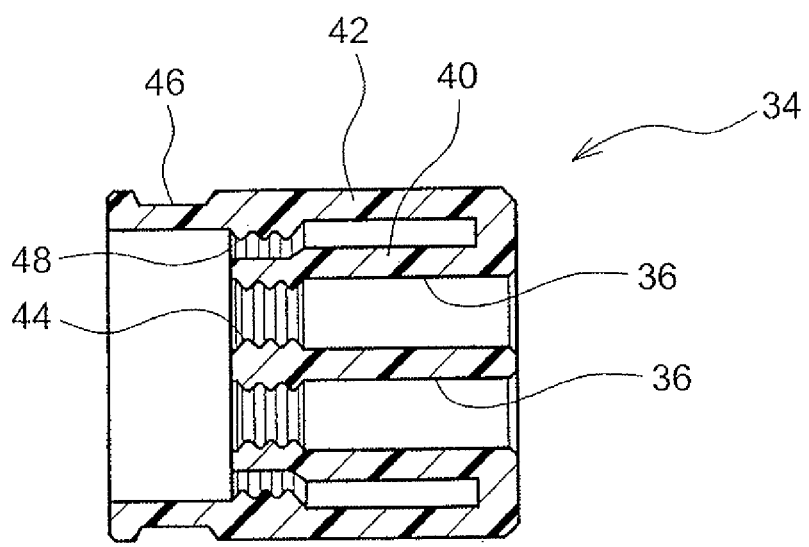
FIG. 3 is a sectional view taken along a line A-A in FIG. 2.

FIGS. 2 and 3 are views each illustrating a detailed configuration of the water cutoff cap 34. FIG. 2 is a view illustrating an outer end surface of the water cutoff cap 34, and FIG. 3 is a sectional view taken along a line A-A in FIG. 2. The water cutoff cap 34 includes: a stopper portion 40 provided so as to penetrate into the conductor tube 22 and to make close contact with a whole circumference of an inner peripheral surface of the conductor tube 22; and a covering portion 42 surrounding the end of the conductor tube 22 from outside. The stopper portion 40 is provided with the through holes 36 each configured to pass the cable 18 therethrough. The inner peripheral surface of the through hole 36 is provided with a plurality of protrusions 44 extending along a whole circumference of the inner peripheral surface in its circumferential direction. In the example shown herein, three protrusions 44 are provided, but one or two protrusions 44 may be provided or more protrusions 44 may be provided. When a tip of the protrusion 44 of the through hole 36 abuts with the cable 18 in a crushed manner, closeness with the cable 18 increases, so that water is cut off more surely.

An outer peripheral surface of the covering portion 42 is provided with a groove 46 extending along a whole circumference of the outer peripheral surface in its circumferential direction. The fastening band 38 is placed within the groove 46, so as to fasten the covering portion 42 with respect to the conductor tube 22 from outside, thereby fixing the water cutoff cap 34 to the conductor tube 22. An inner peripheral surface of the covering portion 42 is provided with a plurality of protrusions 48 extending along a whole circumference of the inner peripheral surface in its circumferential direction. In the example shown herein, three protrusions 48 are provided, but one or two protrusions 48 may be provided or more protrusions 48 may be provided. When a tip of the protrusion 48 of the covering portion 42 is crushed, closeness with the conductor tube 22 increases, so that water is cut off more surely.

In an outermost circumference of the cable harness 10, a corrugate tube 50 having a bellows tubular shape is provided for the purpose of protecting its inner side, e.g., the braided wire 24 (see FIG. 1). The corrugate tube 50 is divided at the grommet 16. Since the corrugate tube 50 has a bellows shape, the corrugate tube 50 is bendable. A slit is formed in the corrugate tube 50 at one place in its circumferential direction so that the slit is cut along a lengthwise direction of the tube. When the corrugate tube 50 is attached, the slit is opened to introduce the cables 18, the braided wire 24, and so on inside the corrugate tube 50, so that these members are covered with the corrugate tube 50. Further, a tape may be wound around an outside of the corrugate tube 50 in a spiral manner as needed.

Cutoff of water between the grommet 16 and the conductor tube 22 is attained by a part at which the grommet 16 makes contact with the conductor tube 22. If a surface of that part of the conductor tube 22 is smooth, the other part thereof may not be smooth. Further, it is possible to provide a protrusion on one of or both of the outer peripheral surface of the conductor tube 22 and the inner peripheral surface of the conductor-tube-side connecting portion 28 of the grommet so as to extend along whole circumferences thereof in the circumferential direction, thereby increasing closeness therebetween.

It is preferable that that part of the outer peripheral surface of the conductor tube 22 which is opposed to the covering portion 42 of the water cutoff cap 34 be a smooth surface. Further, it is preferable that that part of the inner peripheral surface of the conductor tube 22 which is opposed to the stopper portion 40 of the water cutoff cap 34 be a smooth surface.

Instead of the water cutoff cap 34, the cutoff of water inside the conductor tube 22 may be realized by a water cutoff member formed by filling softened resin into gaps between the cables 18 and gaps between the cables 18 and the conductor tube 22, and then hardening the resin after the filling.

What is claimed is:

1. A water cutoff structure for a cable harness penetrating through a hole of a body panel, the cable harness includes a plurality of cables, and an electrically-conductive outer conductor provided so as to surround the plurality of cables, the electrically-conductive outer conductor being partially constituted by a conductor tube having a smooth outer peripheral surface, the water cutoff structure comprising:
an outside water cutoff member placed between the smooth outer peripheral surface of the conductor tube and an edge of the hole of the body panel, the outside water cutoff member being configured to prevent water from passing outside of the conductor tube through the hole of the body panel;

an inside water cutoff member configured to prevent water from passing through the inside of the conductor tube, the inside water cutoff member including a stopper portion and a covering portion, the stopper portion is provided so as to penetrate into the conductor tube and to make close contact with a whole circumference of an inner peripheral surface of the conductor tube, and the covering portion surrounds an end of the conductor tube on an outside of the conductor tube; and a fastening band placed around an outside of the covering portion to fasten the covering portion to the conductor tube.

2. The water cutoff structure for the cable harness, according to claim 1, wherein:
the inside water cutoff member is a water cutoff cap provided so as to cover an end of the conductor tube and having holes configured to pass the plurality of cables therethrough.

3. The water cutoff structure for the cable harness, according to claim 1, wherein:
the electrically-conductive outer conductor includes a braided wire connected to that part of the conductor tube which is placed on an end side relative to a position where the outside water cutoff member is placed, the braided wire extending in a direction to be distanced from the conductor tube.

4. The water cutoff structure for the cable harness, according to claim 1, wherein:
an outer peripheral surface of the covering portion includes a groove extending along a whole circumference of the outer peripheral surface, and
the fastening band is provided within the groove.

5. A cable harness comprising:
a plurality of cables;
an electrically-conductive outer conductor partially constituted by a conductor tube having a smooth outer peripheral surface, and provided so as to surround the plurality of cables;
an inside water cutoff member configured to prevent water from passing through the inside of the conductor tube, the inside water cutoff member including a stopper portion and a covering portion, the stopper portion is provided so as to penetrate into the conductor tube and to make close contact with a whole circumference of an inner peripheral surface of the conductor tube, and the covering portion surrounds an end of the conductor tube on an outside of the conductor tube; and
a fastening band placed around an outside of the covering portion to fasten the covering portion to the conductor tube, wherein:
the smooth outer peripheral surface of the conductor tube receives an outside water cutoff member configured to prevent water from passing between the cable harness and an edge of that hole of a body panel through which the cable harness penetrates.

6. The cable harness according to claim 5, wherein:
the inside water cutoff member is a water cutoff cap provided so as to cover an end of the conductor tube and having holes configured to pass the plurality of cables therethrough.

7. The cable harness according to claim 5, wherein:
the electrically-conductive outer conductor includes a braided wire connected to that part of the conductor tube which is placed on an end side relative to a position where the outside water cutoff member is placed, the braided wire extending in a direction to be distanced from the conductor tube.

8. The cable harness according to claim 5, wherein the outside water cutoff member includes:
- a tubular conductor-tube-side connecting portion connected to the conductor tube;
- an annular body-panel-side connecting portion connected to the body panel; and
- a filmy portion filling up a gap between the tubular conductor-tube-side connecting portion and the annular body-panel-side connecting portion.

9. The cable harness according to claim 8, wherein the filmy portion has a thickness, in a longitudinal direction of the conductor tube, that is less than a thickness of the tubular conductor-tube-side connecting portion and a thickness of the annular body-panel-side connecting portion, in the longitudinal direction of the conductor tube.

10. The cable harness according to claim 5, wherein:
- an outer peripheral surface of the covering portion includes a groove extending along a whole circumference of the outer peripheral surface, and
- the fastening band is provided within the groove.

* * * * *